Patented Aug. 11, 1931

1,818,506

UNITED STATES PATENT OFFICE

DONALD W. ROSS AND JAMES M. LAMBIE, OF WASHINGTON, PENNSYLVANIA

REFRACTORY AND METHOD OF MAKING THE SAME

No Drawing. Substitute for application Serial No. 292,022, filed July 11, 1928. This application filed January 3, 1929. Serial No. 330,133.

Our invention relates to the manufacture of refractories, and more particularly to refractories such as are suitable for use as walls against molten slag and commercial glasses.

This application constitutes in part a division of our copending case, Serial No. 238,-226, filed December 6, 1927, and is a substitute for our application Serial No. 292,022, filed July 11, 1928, and contemplates silica-alumina refractories consisting largely of refractory glass of approximately the silica alumina eutectic composition, the glass varying substantially from 80% $SiO_2$ to 20% alumina, to 95% silica to 5% alumina.

Silica-alumina containing refractories as heretofore manufactured consist chiefly of materials that are more or less noncrystalline, or which are partly crystalline, and which have not been heated sufficiently in their manufacture to convert any considerable percentage thereof into glass. Certain other refractories have been made by melting, the materials being of such composition, and having been so annealed, that in the finished ware they are largely crystalline and contain a minimum amount of glassy matrix, which matrix is not necessarily viscous. Molten or ingot-cast refractories, high in alumina, and containing a maximum amount of crystalline material, such as mullite and corundum, have been manufactured, but apparently no silica-alumina refractories have been manufactured with any intent that they shall consist largely of glass, and particularly of a highly silicious glass.

Highly silicious clays, such as Gross Almerode, which contains 72% silica, have been used in the manufacture of glass pots and other walls for use against molten glass, but, even in the case of such (highly silicious) clay refractories, a large majority of the free silica has been present in the finished ware in a crystalline form, such as quartz and cristobalite. Except that in long service, at glass-melting temperatures, a small fraction of a glass melting pot is converted to such refractory glass, albeit of rather poor quality, and in turn a small fraction of such pots has eventually been ground up and used in the manufacturing of other glass melting pots. In the case of Gross Almerode clay, the glass formed has been of rather poor quality due to the large amount of fluxes which it contains. Also, due to these fluxes, the percent glass has been larger with a given heat treatment than would obtain with the same heat treatment in clays containing less flux. However, the proportion of such glassy material present in such new pots has always been so small that its effect has been negligible so far as our present invention is concerned.

Thus although it is old to burn fire clay products which contain up to seventy-two percent or even more total silica and although in isolated cases small portions of such products have been burned to the stage where they are largely glass, there has never been regular commercial production of such glassy material, nor has there been recognition of this material as such, and, so far as we know, the small quantities produced have never been knowingly used because of their low thermal expansion and of their resistance to glass attack, as hereinafter described. Hence by giving our compositions greater heat treatments than those to which similar compositions have heretofore been commonly subjected, we produce a product which is new to the art.

Upon melting or partially melting certain of the refractory oxides, or mixtures of them, such as silica and alumina, and then cooling, a certain portion of the material fails to crystallize out, and remains as a fairly homogeneous isotropic substance known as glass. The term "refractory glass" as used in this specification refers to the glass present in fired silica-alumina (fire clay) refractories, and does not refer to commercial glasses such as those containing considerable percentages of alkalis, magnesia, lime, boric acid, or lead. Our refractory glass appears isotropic under the petrographic microscope, and is produced only by a heat treatment of an entirely different order.

It is commonly known that in silica-alumina compositions, the refractory glass formed on heating is of substantially the eutectic composition (approximately 95% silica to 5% alumina) except that the impurities which it may contain cause it to dissolve a greater percentage of alumina than would be dissolved if they were not present. Of course, as such a composition approaches its fusion point, the glass present dissolves progressively greater percentages of alumina. At the composition, 95% silica to 5% alumina, the glass, as shown by the binary system worked out in part by Bowen and Greig, has the composition of the eutectic (95% silica and 5% alumina). With progressively more alumina present the glass still remains highly silicious, until an alumina content of 72% is reached, except that as stated above, there is progressively more alumina present in the glass as the liquidous curve is approached.

Although Bowen and Greig (the system $Al_2O_3SiO_2$, Journal American Ceramic Society, vol. 7, No. 4, April, 1924, page 238) have shown in their equilibrium diagram of the binary system silica-alumina, that cristobalite may eventually be expected to crystallize out of such a glass, we have discovered that in silica-alumina refractories (in which the amount of fluxes is relatively small) an exceedingly long heating period at suitable temperatures is required to cause any crystallization of cristobalite, and that such refractories, between the composition 72% alumina to 28% silica and 95% silica and 5% alumina can normally be heated to the point where the mass is entirely mullite and glass without appreciable amounts of cristobalite developing in said mass.

We have discovered that such silica-alumina glass has the additional advantage from the standpoint of spalling that it does not have inversions and that its volume change throughout the range of temperature to which the refractories made of it may be subjected is so small that they do not spall even though subjected to extremes of temperature. The thermal expansion of such glass is only slightly larger than that of quartz glass. Thus we have produced a product which has the valuable properties of fused quartz glass but is not subject to rapid devitrification in use at elevated temperatures as quartz glass is. Further, such highly silicious glass has the advantage that it is stable to its melting point.

It is commonly known that the true (powder) specific gravity of mullite is 3.00, of quartz is 2.65, of tridymite is 2.29 and of vitreous silica is 2.22. Hence in fired silica-alumina bodies the higher the percentage of vitreous silica and tridymite as opposed to mullite and quartz, the lower is the true specific gravity of the material. Again if we define the over-all, or bulk, specific gravity as the figure obtained by dividing the weight of a test piece in grams, by the over all volume in cubic centimeters, this bulk specific gravity is then a function of the true specific gravity and the porosity of the material, and if the porosity and bulk specific gravity are given the true specific gravity is likewise fixed.

In the case of our highly silicious alumina containing material, we prefer that the true specific gravity of the fired material be not over 2.50, and that in most cases the porosity shall not be greater than 24 per cent. The bulk specific gravity in material having a true specific gravity of 2.50 and a porosity of 24% is approximately 2.00.

One object of our invention is to provide a refractory that is composed largely of glass of a particular character.

Another object of our invention is to provide a refractory composed largely of a highly silicious glass.

Another object is to provide a refractory material composed largely of a highly silicious glass of relatively high viscosity.

Another object is to provide a refractory composed largely of a silica-alumina glass of substantially the silica alumina eutectic composition.

Another object of our invention is to provide a refractory material that is composed largely of a highly silicious glass, of such character that not only is there but a small qantity of cristobalite formed, but wherein there is little tendency for cristobalite to crystallize out.

Another object is to provide an improved tank block embodying one or more of the above features.

A further object is to provide highly silicious glasses having a small alumina content and which are resistant to thermal shock.

Still another object is to provide refractories of improved structure and wearing qualities.

Hard-burned tank blocks and other hard burned clay refractories have heretofore been made that contain between 15% and 25% of material that can be identified under the petrographic microscope as being isotropic glass. On the other hand, we find that such high silica alumina bearing glass is not very effective until it constitutes approximately 40% of fired ware made in accordance with our invention and that the desirable properties of such ware are enhanced in proportion as the glass content is increased above this figure. Hence by the term "largely glass", we mean that the body does not contain substantially less than 40% isotropic glass, by volume, consisting largely of silica, together with a much smaller percentage of alumina and in which the other constituents including materials that flux the silica and alumina, constitute not over 6% of the total. In the completed pieces of ware of this type, it is satisfactory for refractory purposes that there be remnants of crystalline silica particles present in the finished ware. The presence of 5% to 7% of crystalline silica does not greatly impair the resistance of the ware to thermal shock, and in some cases (pots) we may prefer to have such crystalline silica content as great as 18% to 20% (in a pot).

Below are given the thermal expansions of several refractory materials in comparison with our silica-alumina eutectic glass and silica-alumina refractory that contains 40% of such glass. Most of the thermal expansion figures are calculated from International Critical Tables. We have recalculated the data to cover the temperature interval zero to one thousand degrees centigrade, the figures being given in percent of cold length.

*Thermal expansion 0 to 1,000° C.*

| Material | Inches per ft. | Per cent linear expansion |
|---|---|---|
| Quartz (I. C. T. vol. IV, p. 21) | | 1.45 |
| Cristobalite (I. C. T. vol. IV, p. 21) | Approx. | 1.7 |
| Tridymite (I. C. T. vol. IV, p. 21) | | 1.1 |
| Vitreous silica (I. C. T. vol. IV, p. 21) | | 0.054 |
| Corundum (I. C. T. vol. II, p. 87) | | 0.676 |
| Mullite | | 0.35 |
| Clay fire brick | 1/16″–3/32″ | 0.43–1.0 |
| Silica brick | 3/16″ plus or minus 1/64″ | 1.19–1.42 |
| Silica-alumina eutectic glass | | 0.085 |
| 40% eutectic glass | } | 0.231 |
| 60% mullite | | |

Potash and soda have large thermal expansions and magnesia has a low thermal expansion, when these materials are used in such refractories. Further in connection with the resistance of our material to thermal shock, vitreous silica is relatively much more elastic than are silica-alumina glasses which are high in alumina.

Petrographic microscopic examination of free silica in a silica-alumina refractory mix which has been heated, but in which practically none of the free silica has been dissolved, shows the silica particles as having sharp corners. While in mixes which have been further matured by heat the silica particles are decidedly rounded by solution, and immediately surrounding them are envelopes of highly silicious glass, commonly termed "solution rims". We find that in cases where our composition is relatively low in fluxes, the solution rims on the silica particles are apt to retain substantially their original angular form, and on account of the small amount of flux, which passes into said rims, part of their contents are apt to be present as tridymite instead of glass.

These solution rims serve to bind the free silica particles to the other ingredients, thus making the ware containing them tougher and more resistant to thermal shock. Crushed or fine ground silica ordinarily consists of grains of various sizes. Hence, in our mixes we find that the finer particles of silica may be entirely dissolved at the stage at which remnants of the coarser particles are still present, each with its solution rim.

Since crystalline silica has large thermal expansion while our highly silicious glass has low thermal expansion, the solution rims possibly owe their effect, in crystalline silica containing bodies of this character, to the fact that the solution rims are largely silicious glass and are formed at high temperatures, at a time when the undissolved remnants are expanded to their maximum size. On subsequent repeated cooling and heating the crystalline remnants which from their nature have large thermal expansion, may thus contract and expand within the solution rims without rupturing them. Since in some cases a given amount of residual free silica does not unduly deteriorate the ware, in these cases solution rims may be present around undissolved remnants of free silica in either highly silicious glass that is added to the raw batch as such, or which may be developed from other free silica of the batch during heat treatment.

We have discovered that normally during wearing-away of the silica-alumina refractories by slags and commercial glasses, an intervening layer of glass develops between the refractory and said slag or commercial glasses, i. e., on the surface of the refractory. Other things being equal, the rate of solution of the refractory body depends upon the nature of this intervening refractory glass.

We have also found that the greater the viscosity of this refractory glass the slower the rate of solution by the above-mentioned slags and commercial glasses.

Geologically, silica and alumina whether chemically combined or not are usually found associated in nature, that is they react similarly towards other elements. This is particularly true in the case of the alkali and alkaline earth metals. Hence, we may expect to find them practically equally reactive to substances such as the soda and lime fluxes of molten glass. This being true, the oxide that yields the most viscous glass at its melting point may be expected to be worn away the more slowly of the two. We have found that in the case of natural clays plus silica, the same relation holds as for pure silica and pure alumina and that the higher the ratio of silica to alumina, the more viscous is the resulting glass at its melting point. Hence highly silicious glasses of this character are more slowly miscible in commercial glasses than are highly aluminous ones, and where used in walls for use against molten glass, may be expected to wear longer than the aluminous ones and not yield "strings" and "ream".

We have discovered that in firing commercial fire clay refractories to the point where they are largely glass, that the glass and mullite relations in them are substantially the same as if pure silica and pure alumina had been used, except that due to the fluxes present, the percentage of glass is slightly larger and the fusion temperatures at given silica alumina ratios are slightly lower. Finally, we have discovered that to resist the dissolving action of commercial glasses, a highly silicious intervening refractory glass is preferable to a highly aluminous one.

We have discovered that a refractory glass of substantially the eutectic composition, on acount of being non-porous, and because it is so viscous at its melting point, serves as the ideal resistant to solution by commercial glasses. As stated above, we have discovered that the intervening layer between such molten commercial glass and the clay wall is of a general feldspar composition, and that the higher the silica content of this intervening layer, relative to its alumina content, the more viscous is the layer, and the more slowly miscible is it in the commercial glass.

In walls for use against molten commercial glass, the silica resists solution by being present as a glass, while the alumina is frequently present as more or less organized crystals of mullite or corundum. We have discovered that the glass form in which the silica is present is more slowly dissolved by molten commercial glass than are the alumina-containing crystals.

Further, on account of the fact that our highly silicious glass is of substantially the same specific gravity as commercial glasses usually made in tanks, it does not tend to run off the clay wall, and remains as a transition layer to protect the latter.

A rough experiment was made to determine approximately the siliciousness of a glass resulting from heating a refractory clay (approximately $$45\% \text{ SiO}_2 : 36\% \text{ Al}_2\text{O}_3 : 13.7\%$$

ignition loss) just below its fusion point until approximate equilibrium had apparently been obtained. Microscopic examination of the fired piece indicated that it was approximately one-half mullite, and that the balance was approximately all glass, there being practically no untransformed material present, and the body having approximately zero porosity. The resultant glass had a silica content in the neighborhood of 80% $SiO_2$. Such a refractory glass serves our purpose quite well. However, we ordinarily prefer to use a raw batch containing a somewhat higher silica content than that of the above-mentioned clay.

In our finished refractory, we desire a highly silicious refractory glass that does not devitrify readily. As explained above, glasses of compositions in the neighborhood of the silica-alumina eutectic fulfill this requirement. However, on account of the impurities contained in natural clays, etc., and the advantages of using small percentages of fluxes, our compositions may contain small percentages of several substances other than silica and alumina. The use of alumina in forming such silicious refractory glass has the advantage that if any of it crystallizes out of solution, it will usually be present as mullite, which is not very objectionable in small quantities.

As stated above, if sufficiently heated, the mixtures which we use will normally be converted largely to silicious glass, except that where alumina is concentrated as in lumps of clay, patches of mullite are formed.

The more suitable range for production of high silica glass lies between five parts alumina to 95 parts silica and 40 parts alumina to 60 parts silica. However, we usually prefer to have an alumina silica ratio in our product of not over 30 parts alumina to 70 parts silica. For example, we might use refractory clay augmented by substantialy pure silica. Refractory clays as a rule contain a greater percentage of materials other than silica and alumina than does commercial silica sand. Hence, in general, the greater the percentage of free silica, which is used in the mix, the smaller the percentage of extrinsic or casually-appearing (adventitious) material that is present. Such silica on going into solution during firing will increase the viscosity of the resulting glass and cause a corresponding increase in the ratio of silica to flux in the glass.

In case it is desired to have a high silica content in the mix relative to the alumina content, we may employ highly silicious minerals either natural or synthetic, as for instance, pyrophyllite ($Al_2O_3$, 4 $SiO_2$, $H_2O$). In case it is desired to introduce potash into the mix, micaceous refractory clays or feldspar can be used for this purpose.

The silica content put into our mixes may be in the nature of quartz, cristobalite, tridymite, chalcedony, crypto-crystalline silica, or of other form, or may be silica which has been fused and ground or mixtures of these substances.

In some cases, for the purpose of altering the behavior of the product during its manufacture or while in use, we find it advantageous to add small percentages of other substances. For instance, we are thereby able to increase the percentage of glass present with a given silica-alumina ratio under a given set of conditions.

In other cases, where service conditions permit, we may add substances which, while tending to insure a large percentage of glass, will also tend to the formation of tridymite instead of the more troublesome cristobalite.

Many of these substances which we prefer to use can be considered as fluxes in silica-alumina refractories. Some of the substances which we use in this way are the oxides of barium, born, beryllium, titanium, tin, lead, lithium, potassium, sodium, calcium, magnesium, strontium, zinc, manganese, cobalt, nickel and iron, and fluorides and phosphates. These substances are usually used in combined amounts not to exceed 6% of the total mix by weight. In case the content of fluxes other than alumina is relatively high, the alumina content may be even below 5%.

There is probably not as great a tendency for deterioration of ware, through separation out of phases, in the case of those substances which form but one glass with silica, which glass is miscible in all proportions of the constituents, as there is in case two immiscible or partly miscible glasses occur. According to the Geophysical Laboratory paper No. 630 by J. W. Greig, most of the substances given in the early part of the above list form completely miscible glasses with silica, while most of these in the latter part of the list do not. Because of the fact that certain of these substances form two more or less immiscible glasses with silica, we prefer for certain purposes, to use percentages of such substances not in excess of that which can be contained by the more silicious of the two glasses. This insures the formation of but a single glass instead of the two immiscible glasses.

The presence of alumina decreases the tendency for cristobalite to crystallize out, in glasses which are of high silica content. The presence of potash, boric oxide and zinc are also said to have this effect.

Of course, the viscosities of the glasses formed between silica and the various other ingredients vary. Other things being equal, we prefer to use such ingredients as will form the most viscous glass with silica. Barium oxide possesses this property to a degree.

Raw ingredients that might be suitably used in our process consist of:

| | Per cent |
|---|---|
| Plastic clay | 40 |
| Silica sand | 55 |
| Fluxes | 5 |
| Refractory clay = (clay substance) | 10– 30 |
| Silica | 90– 70 |
| | 100 100 |

| | | |
|---|---|---|
| Refractory bond clay = | 10– 30 | |
| Crystalline silica = | 15– 60 | |
| Silicious clay grog = | 75– 10 | |
| | 100 100 | |

| | |
|---|---|
| Refractory bond clay | 10– 30 |
| Crystalline silica | 0– 33 |
| Silicious glass | 0– 90 |
| Silicious clay grog | 0– 90 | or in case fluxes are used the above-named fluxes may be used with the above bodies in combined amounts not to exceed 6% of the total, and perhaps as low as 2.5% of the total.

Since it is silicious refractory glass that offers the resistance of the refractory to solution, by molten slags and glass, we form a substantial quantity of it in the refractory. This end can be accomplished in any one of several ways. (1) By one method, a suitable mixture is made up in brick form and sintered to a point at which a suitable portion of the mass has been converted to glass. (2) Another method consists of forming a glass of a desired composition or a grog that is largely glass, grinding such glass or glassy grog to suitable size, mixing it with suitable materials and thereafter molding and firing to a suitable temperature. (3) As mentioned in our said application, a third method consists of melting suitable materials, and, while viscous or fluid, forming or casting them into desired shapes, as by being flowed into molds, run through rolls, or otherwise shaped similar to the manner in which iron is shaped.

Concerning method 3, the softening and molding of such materials as our refractory, requires such a high heat and at this heat the silica is so volatile and in general the difficulties of operating at these high temperatures are so great, that at best this is a very expensive method of manufacturing refractory wares.

Concerning method 1, this method has the advantage of cheapness, in that the materials entering the product are not previously specially processed, and the product requires but one firing.

However, if the percentage of silica in such ware is very low, wares made by this method are not so stable against deformation upon firing, as are wares made according to method 2. On the other hand, if the percentage of silica is too high, this high silica content is apt to cause the ware to crack up during firing, and if the ware does not crack up, its porosity tends to be unduly high unless the ware is burned exceptionally hard.

Concerning method 2 it has the objection that we must previously prepare the silicious glassy grog, which adds to the expense. However, this method has the advantage that practically any desired percentage of silica can be introduced into the body without difficulty. A combination of methods 1 and 2, has the advantage that suitable percentages of crystalline silica can be introduced on account of its cheapness, and additional desired silica contents can be obtained by introduction of highly silicious glass, or glassy grog.

According to method 1, we prefer to use a batch consisting of refractory plastic clay, finely divided silica, and silicious grog. We may prefer to use defloccultable plastic clay, in which case, we deflocculate the mass. In such a deflocculated composition, we may suitably use approximately 20% deflocculatable clay, 15% to 33% silica (in the form of quartz or otherwise), the balance being the silicious grog. Such silicious grog may on account of cheapness have a large percentage of its silica content still in the form of crystalline silica. On firing this body, it is sintered to the point where the crystalline silica content including the silica added as such, the silica in the plastic clay, and the crystalline silica still remaining in the silicious grog are transformed largely to glass, although as stated above, there may suitably be remnants of crystalline silica at the centers of the reaction rims formed from solution of silica particles.

It is commonly known that on transformation of quartz into other crystalline forms of silica during firing of fire clay bodies containing it, such transformation tends to maintain a high porosity in the fired ware. Further, it is commonly known that non-porous silica alumina wares are relatively good conductors of heat, while highly porous silica alumina wares are relatively good heat insulators. Hence, although by methods 1 and 2, we usually prefer to fire the material to the point where substantially all the crystalline silica has been converted into glass and the ware has been burned to a low porosity, we may stop the firing while the ware is still quite porous, and thus obtain a product, which, because of its high silica content is resistant to the dissolving action of molten commercial glass and, because of its porosity, has value as a heat insulator.

In those instances wherein it is desired to reduce or prevent the formation of crystalline silica by devitrification during cooling, the refractory body, while at high temperature will be quenched with water or air. If highly silicious compositions such as those herein referred to are quenched, devitrification does not occur and hence crystalline silica is at a minimum in the cooled ware.

As per method 2, we have described our highly silicious alumina-containing glass as being crushed and bound together with plastic clay and fired. However, such highly silicious grog may be bonded by any other suitable material, before being fired, as for instance by use of silicate of soda, organic matter, or other binders.

Although our method has been described particularly as applying to tank blocks, it applies equally well to all other walls for use against molten glass, as for instance, glass-melting pots, needle valves, and in general, all parts used against molten glass that must stand temperature fluctuations. Further than this, our highly silicious glass composition may suitably be used in other articles that have to stand thermal shock, as for instance, spark plugs, chemical laboratory ware, kitchen utensils, etc., and it may suitably replace quartz glass wares in that they devitrify readily when used at high temperatures while our silicious glass is very slow to devitrify, and can be used for long periods of time without deterioration.

Thus, by firing our highly silicious product to the point where much of the silica has united with the clay, to form a glass, while our product is still highly cellular (porous), we make a good heat insulator that will resist commercial furnace temperatures and sustain loads at such temperatures. Such insulating material differs from previous silica-alumina insulating material in that because of its high silica content, and the high temperatures to which it is fired, it is rigid at temperatures at which previous wares for this purpose lose their insulating value by burning dense.

Tank blocks made by our process have such low thermal expansions and are so elastic that the surface of the block can be fused as by means of an oxyacetylene blow pipe and still not spall. Hence, for certain service, we prefer to actually fuse the surface of such tank blocks either before or after they are set in place in the tank. Likewise, where advantageous, it is possible to fuse the adjoining edges of adjoining blocks together when in place in tanks, or we can fuse our highly silicious glassy grog into a cavity in a block, and for this purpose we may use our material either as grog or made into a plastic mass, using such binder as may be necessary, as for example a small amount of refractory plastic clay. This fusing of the edges of blocks together is particularly advantageous for use in the case of very fluid glasses, such as some of the boro-silicate glasses.

This new material which we have produced has many uses, and on account of its unique properties, its use is particularly advantageous in many cases. As indicated by the composition of our highly silicious alumina containing glass, substantially that of the silica-alumina eutectic (95% $SiO_2$, 5% $Al_2O_3$) its thermal expansion is but slightly larger, and its elasticity is substantially the same as that of vitreous silica, with the result that its resistance to thermal shock is substantially as good as is that of vitreous silica. Hence its resistance to thermal shock is far superior to that of other refractory materials. Further than this it surpasses vitreous silica in that it does not devitrify even under long service at furnace temperatures, while vitreous silica devitrifies rapidly.

Where used as refractories, our product can be heated very rapidly without injury. Thus glass melting tanks built of it can be brought up to melting temperature much more rapidly and safely than can be done with tank blocks heretofore in use. This saving of time makes a substantial saving in the cost of operating glass melting tanks and permits their being let out and again started up without injuring the blocks. Blocks heretofore in use crack so badly on being cooled that the further life of the tank is greatly shortened.

It is an accepted fact that glass tank blocks show the greatest wear at the joints. It is, therefore, highly desirable to prevent glass tank blocks from cracking on the inside surface, as each crack is equivalent to another joint, and cracks in an otherwise good block result in rapid deterioration. We have found that a block with a low coefficient of expansion, will not crack on the hot, inside surface of the tank block when in service, with resulting increase in the life of the block.

Likewise glass melting pots in which our highly silicious alumina containing glassy material is used as grog, are so resistant to thermal shock and to glass action that pots made in this way are practically "fool proof", while pots as heretofore manufactured require very careful handling at all stages of use.

Aluminous materials on dissolving in molten commercial glass cause cords in it. On the other hand our highly silicious glass does not form cords in the glass.

Another instance of such use is clay parts for glass feeder machines. Such parts as needle valves and gate blocks have heretofore required careful heating before being put into service, whereas such parts made of our material can be placed in position in the furnace without any pre-heating.

While ordinary fire clay refractories when used above the flux line in glass melting furnaces drip so badly as to spoil the glass, we have discovered that our refractories made largely of our highly silicious glass form at surfaces exposed to furnace gases, a glass that is so viscous that it does not drip.

Our material is also useful as a refractory cement for furnace patching purposes in that hot patches can be made of it without having them crumble due to thermal expansion. Thus although crystalline and vitreous silica cannot be bonded, for use at high temperatures by a small percentage of binder such as sodium silicate on account of the crystal changes they undergo in service, our material binds into a firm satisfactory mass in service.

Likewise our material may be used for finishing or repairing the interiors of furnaces by being troweled, or sprayed onto the parts to be protected. In general, our material is useful where the part must stand sudden changes of temperature, as for instance in stove backs, gas stoves, electric irons, etc.

Spark plugs etc. have been made which contain large percentages of mullite. On account of the thermal expansion of mullite such wares only stand thermal shock moderately well. Whereas our material, on account of its extremely low thermal expansion and high elasticity is particularly suitable for this purpose.

Further than this, our material on account of its resistance to thermal shock and its permanence, is particularly useful in the form of kitchen and table ware and chemical ware.

We claim as our invention:—

1. The method of making refractories which consists of mixing silica-alumina materials, molding and firing to the point where the mass contains at least 40% glass, the fired product containing not less than a total of 70% silica, nor more than a total of 6% of fluxes other than alumina.

2. The method of making refractories which consists of mixing silica-alumina grog, containing not less than 70% silica nor more than 6% of fluxes other than alumina and which has been fired to the point at which it contains at least 40% glass, with other silica-alumina materials, molding and again firing, the final product containing not less than a total of 70% silica.

3. The method of making refractories which consists of mixing silica-alumina containing not less than 70% silica, nor more than 6% of fluxes other than alumina and which has been fired to the point at which it contains at least 40% glass, with other silica-alumina materials, molding and again firing to the point where the mass contains at least 40% glass, the final product containing not less than a total of 70% silica.

4. The method of making refractories which consists of mixing silica-alumina grog, containing not less than 70% silica, nor more than 6% of fluxes other than alumina and which has been fired to the point at which it contains at least 40% of glass, with plastic clay, molding and again firing to the point at which the mass contains at least 40% glass, the final product containing not less than 70% silica.

5. The method of making ceramic wares which consists of mixing silica-alumina grog, containing not less than 70% silica nor more than 6% of fluxes other than alumina and which has been fired to the point at which it contains at least 40% of glass, with free silica and plastic clay, molding and again firing to the point at which the mass contains at least 40% glass, the final product containing not less than 70% silica.

6. The method of making ceramic wares which consists of mixing silica-alumina grog, containing not less than 70% silica and which has been fired to the point at which it contains at least 40% of glass, with free silica and deflocculatable plastic clay, and molding the mass and again firing to the point at which the mass contains at least 40% glass, the final product containing not less than 70% silica.

7. The method of making silica-alumina ceramic wares which consists of mixing silicious materials with plastic clay, molding and firing to the point where the mass contains at least 40% glass, the final product containing not less than 70% silica.

8. A silica-alumina ceramic ware whose true specific gravity is not over 2.5.

9. A refractory silica-alumina ware whose true specific gravity is not over 2.5, and which contains not over 6% of fluxes other than alumina.

10. A silica-alumina refractory ware whose bulk specific gravity is not over 2.00 and whose porosity is not over 24%, and which contains not over 6% of other ingredients.

11. A refractory body for use against molten slag and glass which is of substantially the silica-alumina eutectic composition and which is at least 40% glass.

12. A silica-alumina refractory body for use against molten slag and glass whose thermal expansion from room temperature to 1,000 degrees C is not over 0.25%.

13. A silica-alumina ceramic ware containing 40% glass and a total of not less than 70% silica, and containing fluxes, the chief flux being magnesia.

14. A silica-alumina ceramic ware containing a total of at least 70% silica, and in which other ingredients do not exceed 6%, and which is at least 40% glass.

15. A silica-alumina refractory ware, containing a total of at least 70% silica, and in which other ingredients do not exceed 6%, that is substantially all mullite and glass.

16. The method of making insulating refractories that consists of firing silica-alumina wares, containing free quartz, to the point where the quartz has been transformed largely to glass, and in which the high porosity incident to the silica transformation is retained.

17. The method of making insulating refractories that consists of firing silica-alumina wares, containing free quartz, to the point where the quartz has been transformed largely to glass, and in which the high porosity incident to the silica transformation is retained, the fired material containing a total of not less than 70% silica.

18. A heat-insulating silica-alumina refractory, containing not less than 40% glass, nor a total of less than 70% of silica, and a total of not over 6% of other ingredients, and which has a porosity of at least 24%.

19. A silica-alumina ceramic ware containing at least 40% glass of substantially the silica-alumina eutectic composition.

20. A silica-alumina refractory containing a total of at least 70% silica, in which other ingredients do not exceed 6%, and in which quartz plus cristobalite does not exceed 20%.

21. The method of making refractories, which comprises mixing silicious and aluminous materials of such character that the melting point of the composition will be higher than that of industrial furnace temperatures, shaping said materials to the article desired, and heating said article to the point where the resulting product will be largely glass.

22. A refractory consisting largely of glass wherein the glass is composed of at least 70% silica, alumina, and not over 5% iron.

23. A refractory consisting largely of glass wherein the glass is composed of at least 70% silica, alumina, and not over 5% iron and cobalt.

24. A silica alumina refractory containing at least 70% silica and not over 5% of iron, cobalt, and magnesium, which refractory is at least 40% glass.

25. The step in the art of glass manufacturing which comprises confining molten glass by a wall consisting largely of a glass having a silica content similar to that of the molten glass.

26. The step in the art of glass manufacturing which comprises confining molten glass by a wall consisting largely of a glass having a silica content similar to that of the molten glass, the glass in the said wall being of higher viscosity than the molten glass.

27. The step in the art of glass manufacturing which comprises confining molten glass by a wall which consists of silica and alumina, contains not over 6% of other ingredients, not less than 70% silica, and not less than 40% glass.

28. A grog for use in the manufacture of ceramic wares comprising a silica alumina glass containing at least 70% silica and not over 6% of other ingredients.

29. The method of making refractories which consists of mixing silica-alumina grog, containing not less than 70% silica nor more than 6% of fluxes other than alumina and which has been fired to the point at which it contains at least 40% glass, with other silica-alumina materials, molding and again firing to the point where the mass contains at least 40% glass, and quenching, the final product containing not less than a total of 70% silica.

30. The method of increasing the silica content of refractories without suffering the bad effects due to a large content of crystalline silica, which comprises adding at least a portion of the silica as a glass that consists largely of silica.

31. The method of increasing the silica content of refractories beyond the point where it is practicable to add quartz on account of cracking in making and in use, which consists in adding as at least a portion of the grog, and especially the finely divided portion thereof, silica dissolved in a small amount of clay.

32. The method of making a highly silicious refractory that is resistant to thermal shock, which consists in adding a silica content to a mix in the form of silica fused with a small amount of alumina.

33. The method of making a highly silicious refractory that is resistant to thermal shock, which consists in adding a silica content to a mix in the form of silica fused with a small amount of alumina, heating the mixture to the point where substantially all crystallization is gone, and quenching.

34. A wall for use in containing molten commercial glass, which consists of a refractory that is substantially all glass and whose viscosity in use is sufficiently high to prevent distortion.

35. The method of increasing the silica content of refractories beyond the point where it is practicable to add quartz on account of cracking in making and in use, which consists in adding as at least a portion of the grog, and especially the finely divided portion thereof, vitreous silica.

In testimony whereof we, the said DONALD W. ROSS and JAMES M. LAMBIE have hereunto set our hands.

DONALD W. ROSS.
JAMES M. LAMBIE.